(12) United States Patent
Ruberg et al.

(10) Patent No.: US 9,525,571 B2
(45) Date of Patent: Dec. 20, 2016

(54) CALIBRATION OF SINGLE-ENDED HIGH-SPEED INTERFACES

(71) Applicant: Lattice Semiconductor Corporation, Sunnyvale, CA (US)

(72) Inventors: Alan T. Ruberg, Menlo Park, CA (US); Srikanth Gondi, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 89 days.

(21) Appl. No.: 14/196,993

(22) Filed: Mar. 4, 2014

(65) Prior Publication Data

US 2014/0253208 A1 Sep. 11, 2014

Related U.S. Application Data

(60) Provisional application No. 61/773,130, filed on Mar. 5, 2013.

(51) Int. Cl.
| | | |
|---|---|---|
| H04L 25/02 | (2006.01) | |
| H03K 3/00 | (2006.01) | |
| H04L 25/03 | (2006.01) | |

(52) U.S. Cl.
CPC ......... *H04L 25/0288* (2013.01); *H04L 25/028* (2013.01); *H04L 25/03885* (2013.01)

(58) Field of Classification Search
CPC ... H03K 3/013; H04L 25/0288; H04L 25/028; H04L 25/03885
USPC .... 327/306, 331, 333, 108, 112; 326/80–81, 326/61–63, 30, 26
See application file for complete search history.

(56) References Cited

U.S. PATENT DOCUMENTS

| | | | |
|---|---|---|---|
| 5,134,311 A | 7/1992 | Biber et al. | |
| 5,508,645 A * | 4/1996 | Castellucci | .......... H03K 5/2418 |
| | | | 327/58 |
| 6,347,850 B1 | 2/2002 | Volk | |
| 6,356,105 B1 | 3/2002 | Volk | |
| 6,452,428 B1 * | 9/2002 | Mooney | ............... H03K 17/164 |
| | | | 326/30 |
| 6,480,022 B2 * | 11/2002 | Bridgewater, Jr. | . G06F 13/4072 |
| | | | 326/31 |
| 6,509,757 B1 | 1/2003 | Humphrey | |
| 6,693,450 B1 | 2/2004 | Volk et al. | |
| 6,744,287 B2 * | 6/2004 | Mooney | ............... H03K 17/164 |
| | | | 326/30 |
| 6,930,507 B2 | 8/2005 | Dreps et al. | |
| 6,937,059 B2 | 8/2005 | Satou et al. | |
| 7,231,306 B1 | 6/2007 | Rajan et al. | |
| 7,358,771 B1 | 4/2008 | Talbot | |

(Continued)

OTHER PUBLICATIONS

Amirkhany, A. et al., "A 12.8-Gb/s/link Tri-Modal Single Ended Memory Inter Face," IEEE Journal of Solid-State Circuits, Apr. 2012, pp. 911-925, vol. 47, Issue 4.

(Continued)

*Primary Examiner* — Dinh T Le
(74) *Attorney, Agent, or Firm* — Fenwick & West LLP

(57) ABSTRACT

A method for calibrating signal swing and a trip reference voltage. The signal swing of a system can be calibrated in a symmetric or asymmetric technique through adjustment of a drive parameter such as a supply voltage for a transmitter or a drive termination. The trip reference voltage of the system can also be calibrated in a symmetric or asymmetric technique through sampling of a data pattern to determine an ideal level of the trip reference voltage.

15 Claims, 11 Drawing Sheets

(56) References Cited

U.S. PATENT DOCUMENTS

| | | | |
|---|---|---|---|
| 7,439,760 B2 | 10/2008 | Nguyen | |
| 7,521,956 B2 * | 4/2009 | Keeth | G11C 7/1078 326/26 |
| 7,558,336 B2 * | 7/2009 | Osaka | H03K 5/135 375/226 |
| 7,656,209 B2 | 2/2010 | Mei | |
| 7,679,397 B1 | 3/2010 | Kok et al. | |
| 7,986,160 B2 | 7/2011 | Hoang et al. | |
| 8,149,015 B2 | 4/2012 | Choi | |
| 8,319,520 B2 | 11/2012 | Kim et al. | |
| 8,436,640 B1 | 5/2013 | Pattnayak et al. | |
| 8,896,341 B2 | 11/2014 | Sofer et al. | |
| 9,041,241 B2 * | 5/2015 | Zhu | H04L 25/02 307/1 |
| 2003/0112751 A1 | 6/2003 | Yuffe et al. | |
| 2004/0165693 A1 | 8/2004 | Lee et al. | |
| 2005/0201491 A1 | 9/2005 | Wei | |
| 2006/0142977 A1 | 6/2006 | Oh et al. | |
| 2006/0255831 A1 * | 11/2006 | Keeth | G11C 7/1078 326/31 |
| 2011/0133772 A1 | 6/2011 | Shau | |
| 2011/0274215 A1 | 11/2011 | Hollis | |
| 2013/0002301 A1 | 1/2013 | Gondi et al. | |

OTHER PUBLICATIONS

Beyene, W.T. et al., "Design and Analysis of 12.8 Gb/s Single-Ended Signaling for Memory Interface," IEEE 20th Conference on International Electrical Performance of Electronic Packaging and Systems (EPEPS), Oct. 2011, pp. 135-138.

PCT International Search Report and Written Opinion, PCT Application No. PCT/US2014/020350, May 26, 2014, 10 pages.

PCT International Search Report and Written Opinion, PCT Application No. PCT/US2014/020363, Jun. 20, 2014, 10 pages.

* cited by examiner

CALIBRATION OF SINGLE-ENDED HIGH-SPEED INTERFACES

CROSS-REFERENCE TO RELATED APPLICATION(S)

This application claims priority under 35 U.S.C. §119(e) to U.S. Provisional Patent Application Ser. No. 61/773,130, "Calibration of Single-ended High-speed Interfaces," filed Mar. 5, 2013, which is incorporated herein by reference in its entirety.

BACKGROUND

1. Field of the Disclosure

Embodiments of the present disclosure generally relate to the field of electronic devices and, more particularly, to calibration of single-ended high-speed interfaces.

2. Description of the Related Art

An interface may include one or more single-wire connections, and single-ended driver may thus drive a signal on the single-wire connection. A single-wire connection may include, for example, a Dynamic Random Access Memory (DRAM) interface.

It has been determined that conventional differential interfaces draw constant power during operation regardless of state (e.g., 0 or 1) and do not have optimal bandwidth or pin, which makes them unsuitable for mobile chip-to-chip communications. Single-ended interfaces suffer from high dynamic (e.g., CV2) or static (e.g., V2/R) loads and thus compromise supply signal integrity leading to lower data rates. Conventional high-speed memory standards use $V_{DD}/2$ (e.g., 600 mV) signaling that provides a factor of four in power efficiency as compared to full swing (e.g., 1.2V CMOS).

At such low signal swings, power noise, ground noise, $V_{REF}$ noise and accuracy play important roles in signal integrity for single-ended communications. The conventional approach of simply designing components and systems to work together is insufficient because specified tolerances approach operating points. The conventional calibration method depends on common $V_{REF}$ sources shared by different devices, which might not match when used internally by different devices, and resistors that are not calibrated, but controlled in steps that cause quantization errors, have process-voltage-temperature (PVT) variations, and exhibit poor linearity.

SUMMARY

Embodiments of the present disclosure are generally directed to calibration of single-ended high-speed interfaces. In some embodiments, a method, device, or system is disclosed for calibration of single-ended high-speed interfaces. The method comprises driving, at the transmitting device, the connection to produce an output voltage level on the connection; comparing, at the transmitting device, the output voltage level to a reference voltage level corresponding to a threshold voltage swing; and adjusting, at the transmitting device, a drive parameter affecting the output voltage level based on a result of comparing the output voltage level to the reference voltage level.

In one embodiment, the connection is single ended. In one embodiment, the driver parameter is adjusted until the output voltage level reaches the reference voltage level.

In one embodiment, the transmitting device drives the connection with a supply voltage using a termination, and the transmitting device adjusts the drive parameter affecting the output voltage by adjusting the termination. In one embodiment, the transmitting device generates the reference voltage level based on an ideal value of the termination and ideal level of the supply voltage.

In another embodiment, the transmitting device drives the connection with a supply voltage using a termination, and the transmitting device adjusts the drive parameter affecting the output voltage by adjusting a level of the supply voltage.

In one embodiment, a transmitting device is disclosed. The transmitting device comprises a transmitter interface to couple to a connection to a receiving device, the transmitter interface driving the connection to produce an output voltage level on the connection; and a comparator to compare the output voltage level to a reference voltage level corresponding to a threshold voltage swing, the transmitting device adjusting a drive parameter affecting the output voltage level based on an output of the comparator.

In one embodiment, the connection is a single-ended connection. In one embodiment, the drive parameter affecting the output voltage level is adjusted until the output voltage level reaches the reference voltage level.

In one embodiment, the transmitting device drives the connection with a supply voltage using a termination, and the transmitting device adjusts the parameter affecting the output voltage level by adjusting the termination. In one embodiment, the transmitting device generates the reference voltage level based on an ideal value of the termination and ideal level of the supply voltage.

In another embodiment, the transmitting device drives the connection with a supply voltage using a termination, and the transmitting device adjusts the parameter affecting the output voltage level by adjusting a level of the supply voltage.

In one embodiment, a system comprises a transmitting device driving a connection to produce an output voltage level on the connection; and a receiving device coupled to the transmitting device via the connection, the receiving device comparing the output voltage level to a reference voltage level corresponding to a threshold voltage swing and causing the output voltage level to be adjusted based on a result of comparing the output voltage level to the reference voltage level.

In one embodiment of the system, the connection is a single-ended connection. In one embodiment of the system, the receiving device causes the output voltage level to be adjusted until the output voltage level reaches the reference voltage level.

In one embodiment of the system, the transmitting device drives the connection with a supply voltage using a termination, and the receiving device causes the output voltage level to be adjusted by commanding the transmitting device to adjust the termination of the transmitting device based on the result of comparing the output voltage level to the reference voltage level. In one embodiment, the receiving device generates the reference voltage level based on an ideal value of the termination and ideal level of the supply voltage.

In another embodiment of the system, the transmitting device drives the connection with a supply voltage using a termination, and the receiving device causes the output voltage level to be adjusted by commanding the transmitting device to adjust a level of the supply voltage based on the result of comparing the output voltage level to the reference voltage level.

In a further embodiment of the system, the receiving device terminates the connection with a termination, and the receiving device causes the output voltage level to be adjusted by adjusting the termination of the receiving device based on the result of comparing the output voltage level to the reference voltage level.

Other embodiments of the present disclosure are a method for calibrating a trip reference voltage. The method comprises receiving, at a receiving device, a data pattern from a transmitting device via a connection; sampling, at the receiving device, the data pattern into samples with the trip reference voltage; and adjusting, at the receiving device, the trip reference voltage based on the samples.

In one embodiment, the method further comprises monitoring the samples for data transitions in the data pattern, where the trip reference voltage is adjusted at the receiving device based on the data transitions in the data pattern. In one embodiment, the trip reference voltage is adjusted until a duration of time between the data transitions is maximized. In one embodiment, the method further comprises setting a sampling point to an average of a first time offset of a first data transition and a second time offset of a second data transition. In one embodiment, the connection is a single-ended connection.

According to another embodiment of the present disclosure, a receiving device is provided. The receiving device comprises a receiver interface to receive a data pattern from a transmitting device via a connection, where the receiving device samples the data pattern with a trip reference voltage and adjusts the trip reference voltage based on the samples.

In one embodiment, the receiving device monitors the samples for data transitions in the data pattern and adjusts the trip reference voltage based on the data transitions in the data pattern. In one embodiment, the receiving device adjusts the trip reference voltage until a duration of time between the data transitions is maximized. In one embodiment, the receiving device sets a sampling point to an average of a first time offset of a first data transition and a second time offset of a second data transition. In one embodiment, the connection is a single-ended connection.

According to yet another embodiment of the present disclosure, a transmitting device is provided. The transmitting device comprises a transmitter interface to transmit a data pattern to a receiving device via a connection, the receiving device having a trip reference voltage for sampling the data pattern; and a receiver interface to receive a sampled version of the data pattern from the receiving device, where the transmitting device compares the data pattern to the sampled version of the data pattern and commands the receiving device to adjust the trip reference voltage based on a result of comparing the data pattern to the sampled version of the data pattern.

In one embodiment, the transmitting device commands the receiving device to increase the trip reference voltage responsive to the result of comparing the data pattern to the sampled version of the data pattern indicating a data error. In one embodiment, the transmitting device commands the receiving device to lower the trip reference voltage responsive to the result of comparing the data pattern to the sampled version of the data pattern indicating a data error. In one embodiment, the transmitting device uses the result to identify a first level of the trip reference voltage producing data errors and to identify a second level of the trip reference voltage producing data errors, and the transmitting device averages the first level and the second level of the trip reference voltage to generate a setting for the trip reference voltage. In one embodiment, the connection is a single-ended connection.

BRIEF DESCRIPTION OF THE DRAWINGS

The teachings of the embodiments disclosed herein can be readily understood by considering the following detailed description in conjunction with the accompanying drawings.

DETAILED DESCRIPTION

Figure 1:
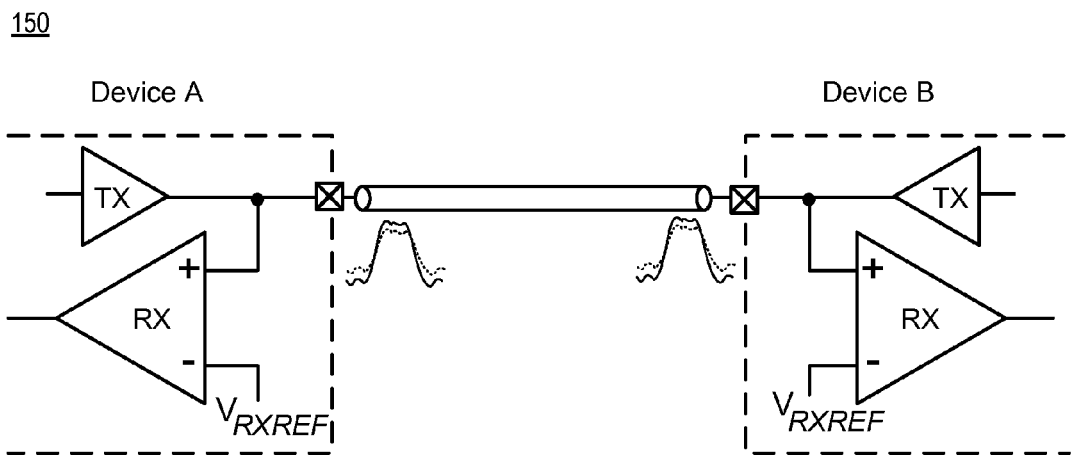
FIG. 1 is a data communication system with a single-ended interface, according to one embodiment

Reference will now be made in detail to several embodiments, examples of which are illustrated in the accompanying figures. It is noted that wherever practicable similar or like reference numbers may be used in the figures and may indicate similar or like functionality. The figures and accompanying description depict various embodiments for purposes of illustration only. One skilled in the art will readily recognize from the following description that alternative embodiments of the structures and methods illustrated herein may be employed without departing from the principles described herein.

Embodiments of the present disclosure solve the following problems existing in the calibration and design of an interface: the receiver threshold reference voltage ($V_{RXREF}$) needs to be calibrated for reliable data transmission between the transmitter and receiver, and the transmitter swing ($V_{SWING}$) needs to be minimized to optimize power utilization.

In some embodiments, a process includes performing calibration of transmitter drive termination according to a conventional process, followed by:

(1) $V_{SWING}$ calibration for a local device, such as a memory controller. Remote termination is engaged and the transmitter drives high. The resulting output voltage is measured at the transmitter side, which is trimmed using a method that depends on the driver architecture to match a reference voltage.

(2) $V_{SWING}$ calibration for a remote device, such as a memory device. If a remote transmitter has limited ability to control its swing (asymmetric case), then the local receiver can measure the swing and adjust its termination resistance.

(3) $V_{RXREF}$ calibration for a local device. A pattern is output by the remote transmitter to be used to measure the local receiver eye width. The eye width is measured at several receiver reference voltage values, and the reference value that produces longest time of valid data is chosen. Furthermore, the best sampling point can be derived by averaging between the first and last data valid times.

(4) $V_{RXREF}$ calibration for a remote device. If a remote receiver has limited ability to determine data validity, the received data can be sent back to the transmitting device for comparison and control.

An embodiment of a process provides an improvement on single-ended calibration techniques made available through Joint Electron Device Engineering Council (JEDEC) memory standards. Such standards do not have sufficient accuracy for small swings, and the complexity would generally too great to make improvements on the memory side of a transmission.

In some embodiments, a process is automated, and it trims based on the actual loading device and channel.

In some embodiments, low amplitude, single-ended high-speed inter-device communications are more pin and power efficient than differential interfaces in common use. High-speed differential interfaces can benefit from two signals swinging in opposition such that one is of lower amplitude than the other so it is relatively easy to determine the state of the signal. Small swing high-speed single-ended interfaces are more sensitive to changes and noise in the power supply and the reference threshold voltage level ($V_{RXREF}$) used to determine the state of the signal. In some embodiments, to compensate for these changes and noise, the single-ended interfaces require calibration of signal swing ($V_{SWING}$) and reference threshold voltage level ($V_{RXREF}$) during operation. Conventional approaches have insufficient accuracy for small swings. In some embodiments, a process is disclosed for measuring and optimizing the transmitter signal swings and receiver reference threshold voltage levels on both sides of an interface in the working system with greater accuracy.

Conventional systems operate at less than half the speed and more than twice the swing of the embodiments of the present disclosure. Such conventional systems rely on simpler calibration schemes that do not depend on the operating data eye or receiver threshold. These methods are dealt with at the design stage rather than with operating devices. This technology compensates for die-to-die differences, on-die device quantization errors, and device PVT differences.

In cases where the physical layer is unable to calibrate itself, novel methods for remote measurement and control are brought to bear. It is desirable to lower power even further in mobile systems, and in some embodiments a much smaller swing (e.g. 100-400 mV) than conventional systems is being proposed. Embodiments may apply any small swing (e.g., less than $V_{DD}/2$) to a single-ended galvanic interface that self-calibrates.

The necessity to lower signal voltage to save power is being driven by the bandwidth required for inter-device communication, particularly with memory devices (e.g., DRAM) connected to application processors.

FIG. 1 is a data communication system with a single-ended interface, according to one embodiment. The system includes two devices A and B. Each device includes a transmitter interface circuit TX that transmits a single ended signal to the receiver interface circuit RX of the other device. In one embodiment, device A is a memory controller and device B is a memory device, such as a DRAM memory device. Only one transmitter TX and one receiver RX are shown for each device, but in other embodiments each device may have multiple TX and RX interface circuits communicating over multiple single-ended connections.

The illustrated single-ended interface includes a single galvanic connection. Single-ended signaling has been used successfully in device-to-device communication to transmit multiple Gbit/sec, particularly in the memory area. These interfaces are carefully specified to help overcome noise and signal propagation problems; however, the need to lower voltage swings to save power as bandwidth increases has placed a strain on the ability to use predetermined interface specifications. Component tolerances and noise margins are also approaching levels required for reliable operation.

Figure 2A:
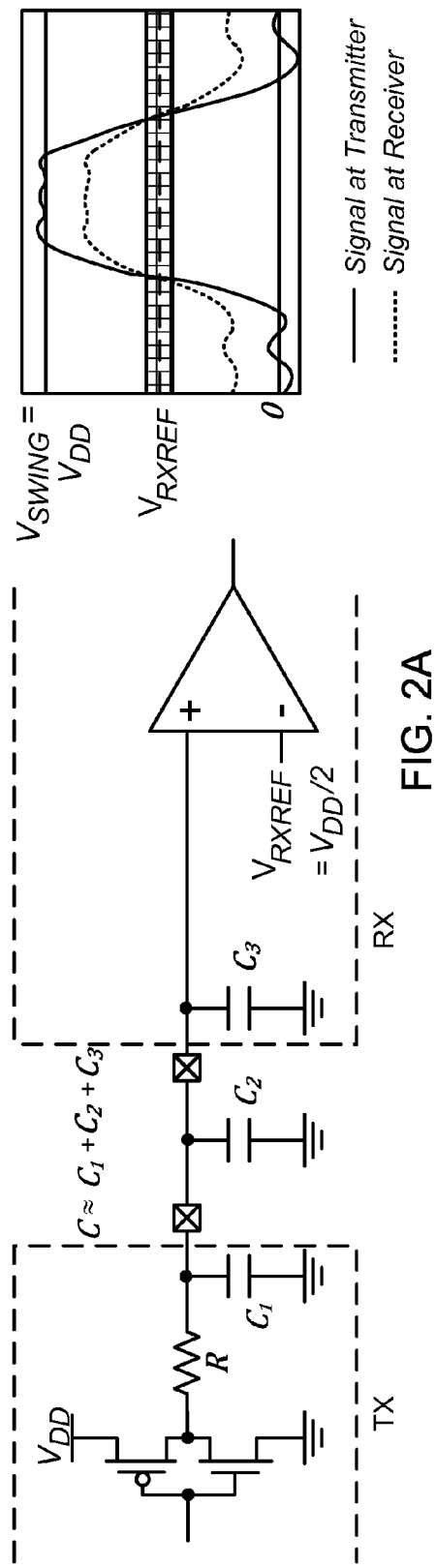
FIG. 2A is a circuit diagram illustrating a full-swing interface, according to one embodiment.

A first technique for avoiding noise and tolerance problems in a single ended-interface is to maximize the signal swing. FIG. 2A is a circuit diagram illustrating a full-swing interface, according to one embodiment. The illustrated full-swing interface can achieve the maximum voltage easily. For example, the maximum voltage is the power supply level (e.g., $V_{DD}$). In this embodiment, the receiver RX is not resistively terminated, but the transmitter-channel-receiver system still has capacitance (C). The power used by the interface is proportional to $CV_{DD}^2 f$; where f is the average switching frequency. Note that the power changes significantly with voltage. At multiple Gbit/sec speeds, the transmitter impedance is controlled carefully. Too low impedance causes overshoot that overloads the receiver, shortens the receiver life, and causes ringing that produces errors. Too high impedance causes undershoot, reducing the signal and introducing errors due to noise.

Figure 2B:
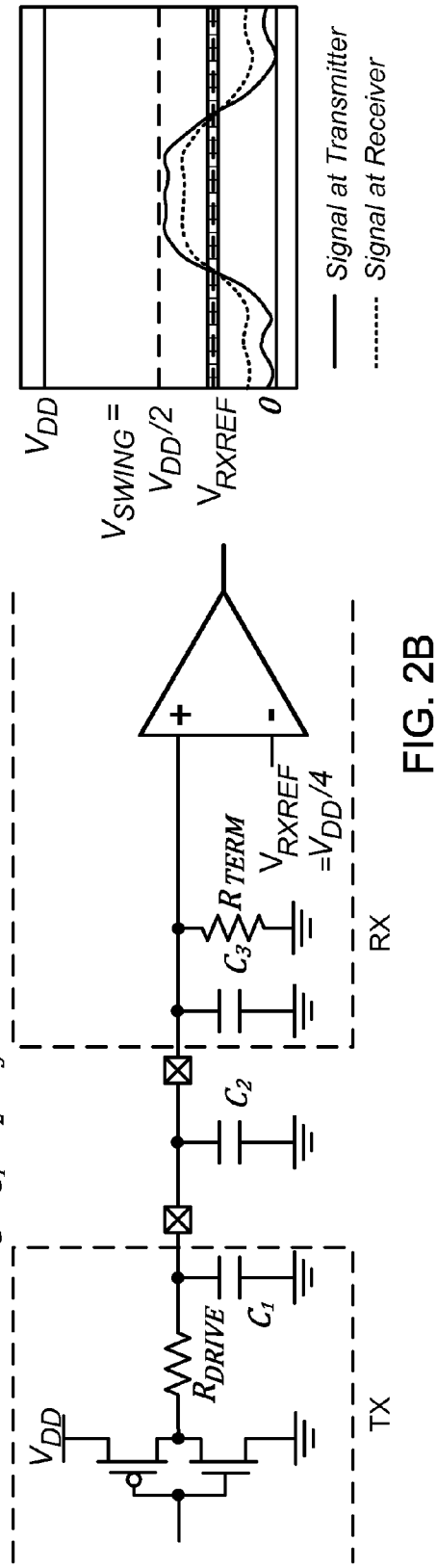
FIG. 2B is a circuit diagram illustrating a pseudo-open drain interface, according to one embodiment.

To reduce power and improve signal integrity at high data rates, termination may be introduced at the receiver RX of a single ended-interface, such as in the pseudo-open drain (POD) configuration, as described in JEDEC publication JESD8-19. FIG. 2B is a circuit diagram illustrating a pseudo-open drain interface, according to one embodiment. The illustrated pseudo-open drain interface drives a connection at the transmitter TX to a voltage level (e.g., ground or $V_{DD}$) using a transmitter drive termination $R_{DRIVE}$. In addition, the illustrated pseudo-open drain interface terminates a connection at the receiver RX to a voltage level (e.g. ground) using a receiver termination $R_{TERM}$. If the transmitter drive termination $R_{DRIVE}$ and receiver termination $R_{TERM}$ impedances are the same, the swing $V_{SWING}$ becomes $V_{DD}/2$. The dynamic power component ($C(V_{DD}/2)^2 f$) is reduced by a factor of four; however, a static component of $(V_{DD}/2)^2/R$ is added. Fortunately, no static power is drawn in the state where the transmitter voltage equals the receiver termination voltage. Other than controlling reflections caused by mismatches between transmitter TX, receiver RX, and channel impedances, signal quality is defined by the precision and noise of a threshold reference voltage source $V_{RXREF}$ that defines the trip point between states (e.g., ±3% $V_{DD}$ tolerance including noise as illustrated) and the ratio of the transmitter TX and receiver RX impedances that determine the total signal swing $V_{SWING}$. Imbalances between the transmitter TX and receiver RX impedances not only change the amplitude of the signal but they change the midpoint of the signal in relation to $V_{RXREF}$. The ideal sampling point is where $V_{RXREF}$ equals $V_{SWING}/2$.

In a practical system with 100 or more interfaces being used, manufacturer calibration of precision resistors is impractical. Furthermore, it is unlikely that the integrated circuit process being used supports precision resistors; rather, typical bulk CMOS process supports resistors that exceed ±20% tolerance. In some embodiments, to produce better tolerance, a calibration system is used to provide a process that includes providing an external precision resistor ($Z_Q$) with which a variable internal resistor is calibrated, as described in Micron Technology TN-41-02. Once the 'code' for the calibrated resistor is known, it can be propagated to other nearby resistors. After calibration, the guaranteed tolerance for a memory process is ±10%, more than that for a typical termination resistor (e.g., ±5% maximum). The calibration process is repeated periodically to compensate for power supply and temperature variations.

Figure 3A:
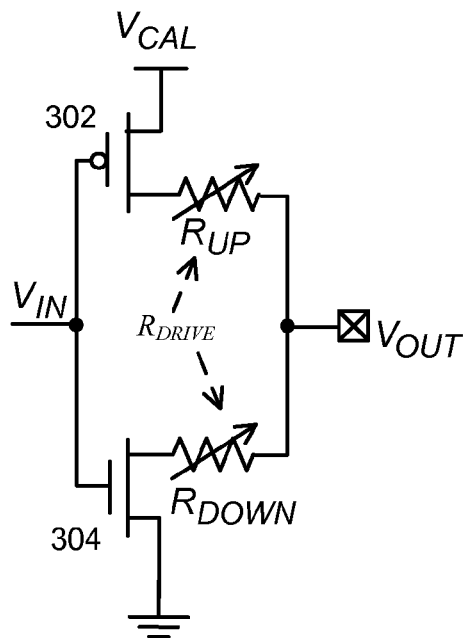
FIGS. 3A-3C are circuit diagrams illustrating a driver model suitable for use as a transmitter interface circuit TX, according to one embodiment.
Figure 3C:
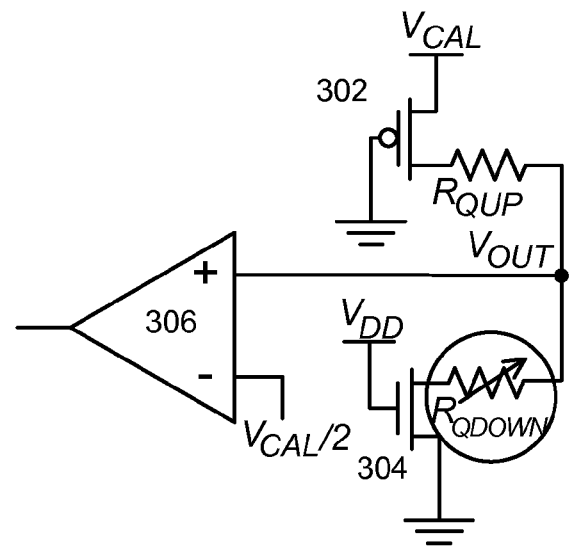
Figure 3B:
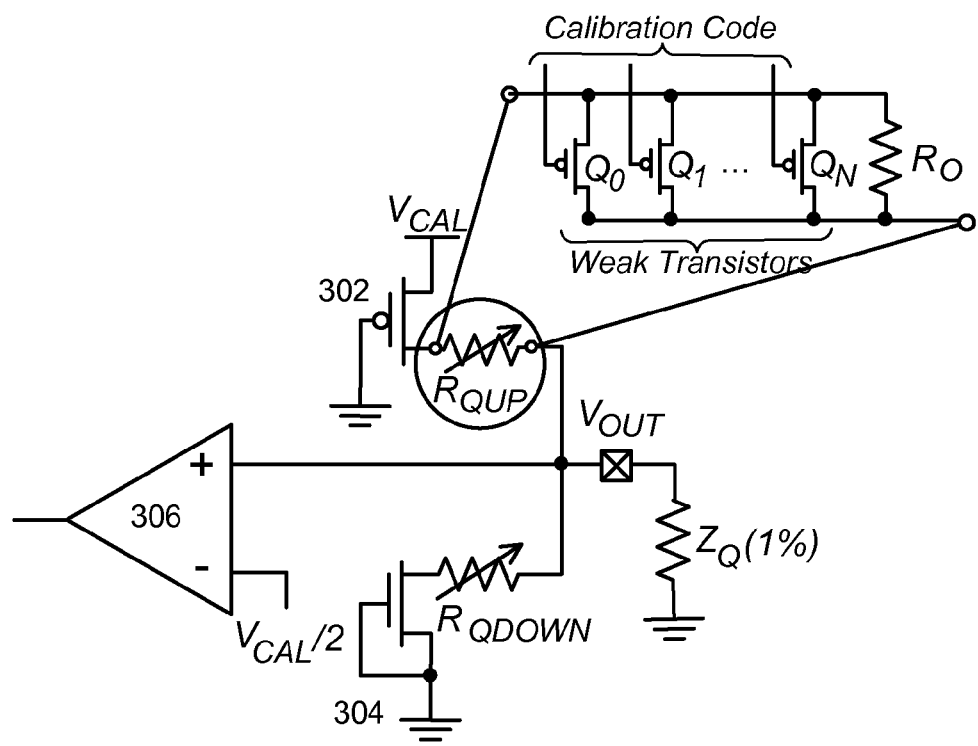

FIGS. 3A-3C are circuit diagrams illustrating a driver model suitable for use as a transmitter interface circuit TX, according to an embodiment. Referring now to FIG. 3A, illustrated is a practical example of a driver model for a device. The example driver model includes an 'up' drive P-channel transistor 302 connected to a supply voltage $V_{CAL}$ and a 'down' drive P-channel transistor 304 connected to ground. The driver model also splits drive termination $R_{DRIVE}$ at the transmitter TX into an 'up' drive $R_{UP}$ using P-channel MOSFET transistors, and a 'down' drive $R_{QDOWN}$ using N-channel MOSFET transistors. The same driver structure can be used at the receiver RX for termination, where the 'down' drive is used for termination $R_{TERM}$ as illustrated in the previous example of FIG. 2B. The driver produces an output voltage $V_{OUT}$ on the channel.

Referring now to FIG. 3B, details of the $R_{UP}$ and $R_{QDOWN}$ are illustrated. In the illustrated embodiment, the $R_{UP}$ and $R_{QDOWN}$ are made up of several calibrated chains in parallel. Each chain $R_{QUP}$ or $R_{QDOWN}$ is made up of a bulk process resistor $R_O$, which has larger resistance than required, and weak transistors in parallel ($Q_O \ldots Q_N$) for trimming the chain down to the closest correct value possible. The weak transistors ($Q_O \ldots Q_N$) are MOSFET transistors that have a high resistance when switched on. The chain is controlled by calibration logic (not shown). In addition, the output of the driver is terminated to ground with an external pull-down resistor $Z_Q$. Further, the power source $V_{CAL}$ for the driver circuit and the selection of $Z_Q$ depends on the device. $V_{CAL}$ can be independent of or the same as $V_{DD}$. The value of $Z_Q$ may be chosen from a range of 50Ω-100Ω. For example, a typical value of $Z_Q$ is 50Ω.

The driver model structure shown in FIG. 3B corresponds to a first step of a resistor calibration process for the device that sets $R_{QUP}$ to an ideal value equal to $Z_Q$. In the first step performed by the driver model, $R_{QUP}$ is compared to $Z_Q$. The 'up' P-channel transistor 302 is turned on and the 'down' N-channel transistor 304 is turned off, effectively removing it from the circuit. The strategy for calibration is to match $R_{QUP}$ and $Z_Q$ by placing them in a series voltage divider circuit and comparing the output voltage $V_{OUT}$ to one half of the power supply voltage (i.e., ½ $V_{CAL}$) through comparator 306. If the output voltage $V_{OUT}$ is too low, then some weak $Q_O \ldots Q_N$ transistors are turned on, lowering the impedance $R_{QUP}$ and raising the voltage $V_{OUT}$. If the voltage $V_{OUT}$ is too high, then some $Q_O \ldots Q_N$ transistors are turned off, raising the impedance $R_{QUP}$ and lowering the voltage. Once the calibration is complete, the calibration logic is copied to nearby $R_{QUP}$ chains for different drivers, possibly including some in other interfaces, to avoid the need to calibrate every interface separately.

Referring now to FIG. 3C, a driver model structure corresponding to a second step of a resistor calibration process is illustrated, according to one embodiment. For practical reasons, this embodiment compares $R_{QDOWN}$ to $R_{QUP}$ instead of a second precision resistor. This is done by turning on both of the 'up' and 'down' transistors 302 and 304, causing $R_{QUP}$ and $R_{QDOWN}$ to form a series voltage divider similar to the first step. The chains in $R_{QDOWN}$ are the same as for $R_{QUP}$ except that they are made up of N-channel weak transistors and the control is reversed. If the voltage $V_{OUT}$ is too high, then some weak $Q_O \ldots Q_N$ transistors are turned on, lowering the impedance $R_{QDOWN}$ and the voltage $V_{OUT}$. If the voltage $V_{OUT}$ is too low, then some $Q_O \ldots Q_N$ transistor are turned off, raising the impedance $R_{QUP}$ and the voltage. Although the optimization of using $R_{QUP}$ as a reference has system benefits such as using $V_{CAL}$ as an accurate pull-up reference and lowering system cost and complexity, $R_{QUP}$ is only accurate to 10%, which means that the value of $R_{QDOWN}$ is perturbed, and which will cause a shift in the output swing.

Figure 4:
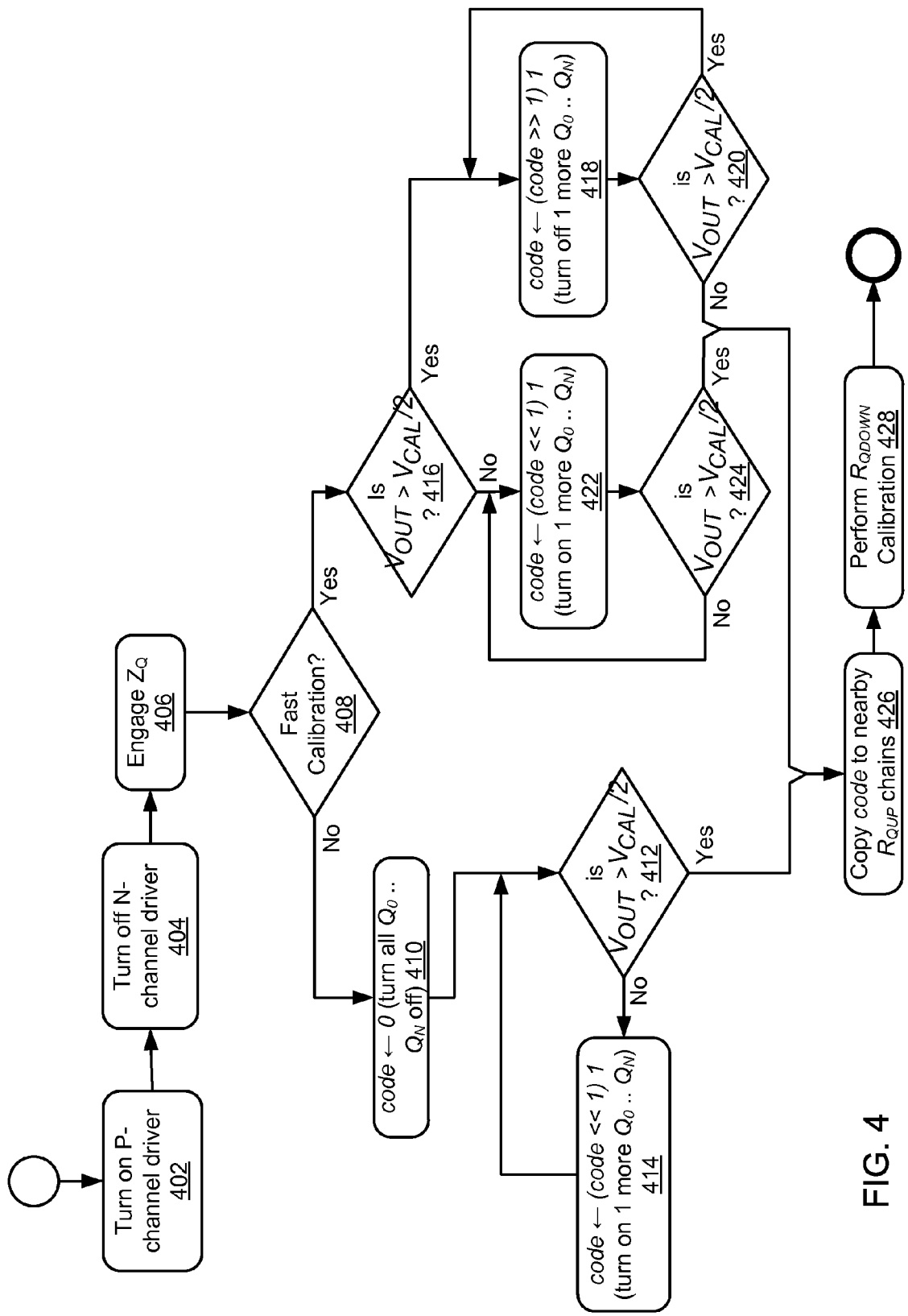
FIG. 4 is a flowchart of an external pull-down resistor calibration process performed by the driver model of FIG. 3A-3C, according to one embodiment.

FIG. 4 is a flowchart of the external pull-down resistor calibration process performed by the driver model of FIG. 3A-C, according to one embodiment. Steps 402 through 426 correspond to FIG. 3B, and step 428 corresponds to FIG. 3C. In step 402, the calibration logic turns on P-channel driver 302 so that the output of the driver model is driven using the $R_{QUP}$. In step 404, the calibration logic turns off N-channel driver 304, effectively removing $R_{QDOWN}$ from the circuit. In step 406, the calibration logic engages the external pull-down resistor $Z_Q$. In step 408, the calibration logic determines if the device needs a fast calibration or regular calibration. For example, if the device has previously been calibrated using $Z_Q$ and only needs fine tuning, then the calibration logic determines only a fast calibration is needed. If the device has not yet been calibrated, the calibration logic determines that regular calibration is needed.

If the calibration logic determines that a fast calibration is not appropriate, then in step 410, the calibration logic sets the calibration code to all zeroes, which turns off all the weak $Q_O \ldots Q_N$ transistors in $R_{QUP}$. In step 412, the calibration logic determines if the output result voltage $V_{OUT}$ is larger than one half of the power supply (½$V_{CAL}$) using the output of the comparator 306. If so, in step 414 the calibration logic increments the code to turn on an additional weak $Q_O \ldots Q_N$ transistor in $R_{QUP}$. The process returns to step 412 and the calibration logic determines again if the new output voltage $V_{OUT}$ is larger than one half of the power supply voltage (½$V_{CAL}$). The steps 412 and 414 repeat in a loop until the calibration logic determines that the output voltage $V_{OUT}$ is less than or equal to one half of the power supply voltage (½$V_{CAL}$). Then, in step 426 the calibration logic copies the calibration code to nearby $R_{QUP}$ chains.

If the calibration logic determines that a fast calibration is appropriate, then the calibration logic calibrates the device in one of two possible two directions. In step 416 the calibration logic determines if the output voltage $V_{OUT}$ is larger than one half of the power supply voltage (½ $V_{CAL}$) using the output of the comparator 305. If so, then in step 418 the calibration logic decrements the calibration code to turn off one more of the weak $Q_O \ldots Q_N$ transistors in $R_{QUP}$ and, and in step 420, determines if the new output voltage $V_{OUT}$ is larger than one half of the power supply voltage (½$V_{CAL}$). If the new output voltage $V_{OUT}$ is still larger than one half of the power supply voltage (½$V_{CAL}$, then the calibration logic repeats the step 418 to decrement the calibration code to turn off one more of the weak $Q_O \ldots Q_N$ transistors until the calibration logic determines that the new output voltage $V_{OUT}$ is less than or equal to one half of the power supply (½$V_{CAL}$).

If in step 416 the calibration logic determines that the output result voltage ($V_{OUT}$) is not larger than one half of the power supply ($\frac{1}{2}V_{CAL}$, then in step 422 the calibration logic increments the calibration code to turn on one more of the weak $Q_O \ldots Q_N$ transistors in $R_{QUP}$, and in step 424, determines if the new output voltage $V_{OUT}$ is larger than one half of the power supply voltage ($\frac{1}{2}V_{CAL}$) using the output of the comparator 305. If the new output voltage $V_{OUT}$ is still not larger than one half of the power supply voltage ($\frac{1}{2}V_{CAL}$, then the calibration logic repeats step 422 to increment the calibration code to turn on one more of the weak $Q_O \ldots Q_N$ transistors until the calibration logic determines that the new output voltage $V_{OUT}$ is larger than one half of the power supply voltage ($\frac{1}{2} V_{CAL}$).

The resulting calibration code is copied to nearby $R_{QUP}$ chains for other transmitters TX in step 426. In step 428, the calibration logic performs $R_{QDOWN}$ calibration by comparing $R_{QDOWN}$ to $R_{QUP}$, as previously described with respect to FIG. 3C.

Note that in the POD interface (e.g., from FIG. 2B) that $R_{DRIVE}$ and $R_{TERM}$ reside in different devices that have different process characteristics, operate at different temperatures, and may have different voltage sources, noise, or routing from the power supply. The two devices react differently to their different environments. In realistic circumstances, the transmitter TX is unable to accurately determine $V_{RXREF}$ at the receiver RX or how it is being put to use by the receiver RX. In single-ended interfaces operating above $V_{DD}/2$, these problems are overcome by standardizing component tolerances, careful system design, and extensive testing.

To further improve signal integrity and reduce power (and to make allowances for reducing supply voltage due to process feature size reduction) as bandwidth increases (e.g., by at least 2 times), interfaces with swings smaller than $V_{DD}/2$ are being deployed. This puts a great burden on the tolerances of $R_{DRIVE}$, (e.g., $R_{UP}$ and $R_{DOWN}$ at the transmitter), $R_{TERM}$ (e.g., $R_{DOWN}$ at the receiver), and $V_{RXREF}$.

The conventional approach of simply designing components and systems to work together is insufficient because specified tolerances approach operating points as the swing decreases. The conventional calibration method depends on common $V_{RXREF}$ sources that might not match when used internally by different devices, and resistors that are not calibrated, but controlled in steps that cause quantization errors, have PVT (process, voltage, temperature) variations, and exhibit poor linearity. Errors accumulate when considering that the transmitter and receiver are performing calibration independently.

Independently calibrating devices causes two problems: The receiver RX threshold reference ($V_{RXREF}$) needs to be calibrated for consistency between the transmitter TX and receiver RX, and the transmitter swing ($V_{SWING}$) needs to be minimized to optimize power utilization.

In some embodiments of the present disclosure, a dynamic closed-loop approach is used to co-calibrate the transmitter TX and receiver RX. The same structures are used to perform the operations; however, calibrating measurements include contributions of $R_{DRIVE}$ and $V_{SWING}$ at the transmitter TX, and $R_{TERM}$ and $V_{RXREF}$ at the receiver RX. As a beneficial side-effect, perturbations caused by the channel between transmitter TX and receiver RX are taken into account.

In some embodiments, a process includes providing stimulus using both the transmitter TX and receiver RX, and making measurements and adjustments within individual devices where PVT variables are consistent and controlled.

In some embodiments, before starting, the basic calibration described above with reference to FIGS. 3B-3C and 4 may be applied. This may help to bootstrap the fine calibration process since some data exchange will be possible afterwards. It also may have the benefit of helping the new method converge more rapidly.

Figure 9:
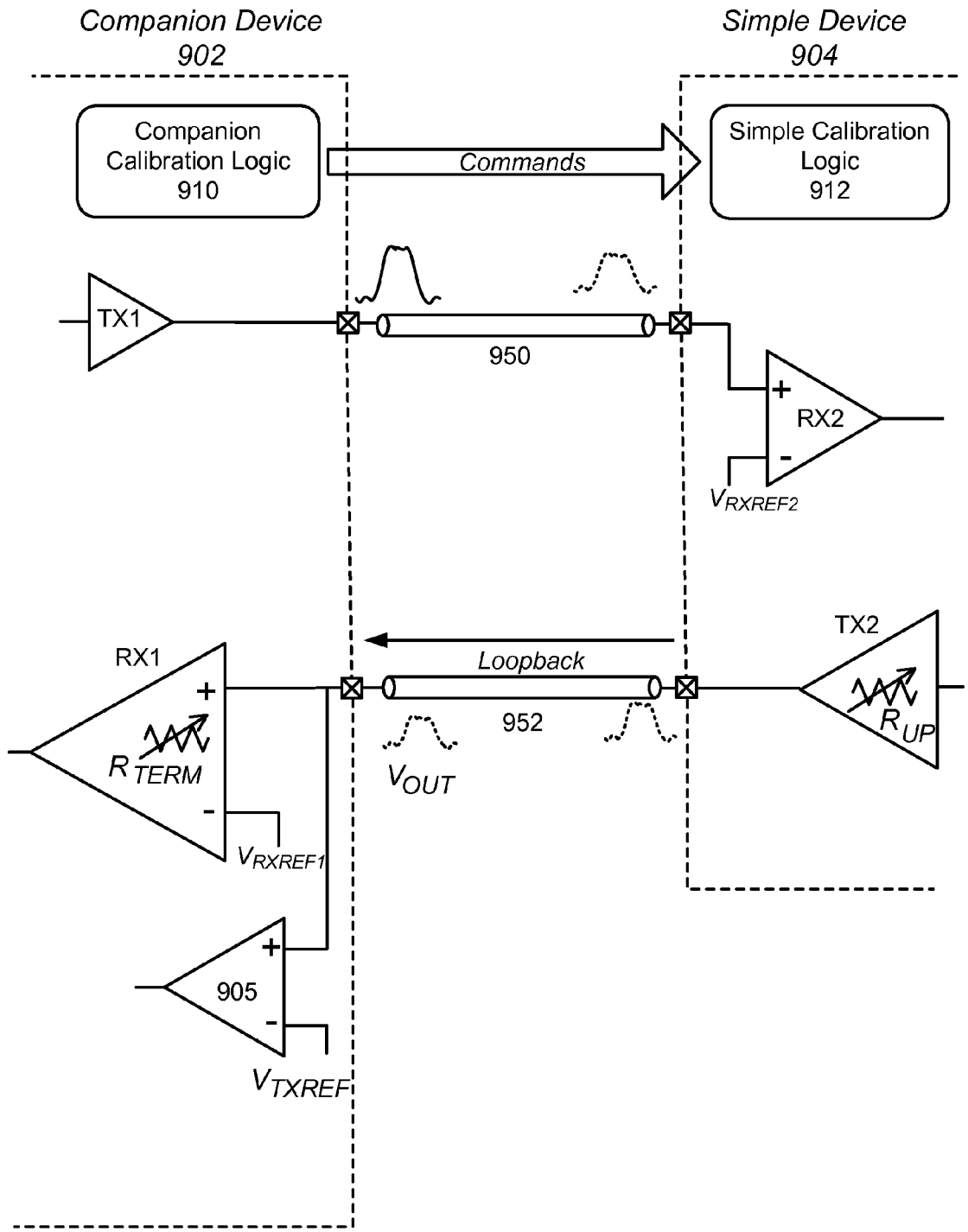
FIG. 9 is a data communication system for remote calibration, according to one embodiment.
Figure 10:
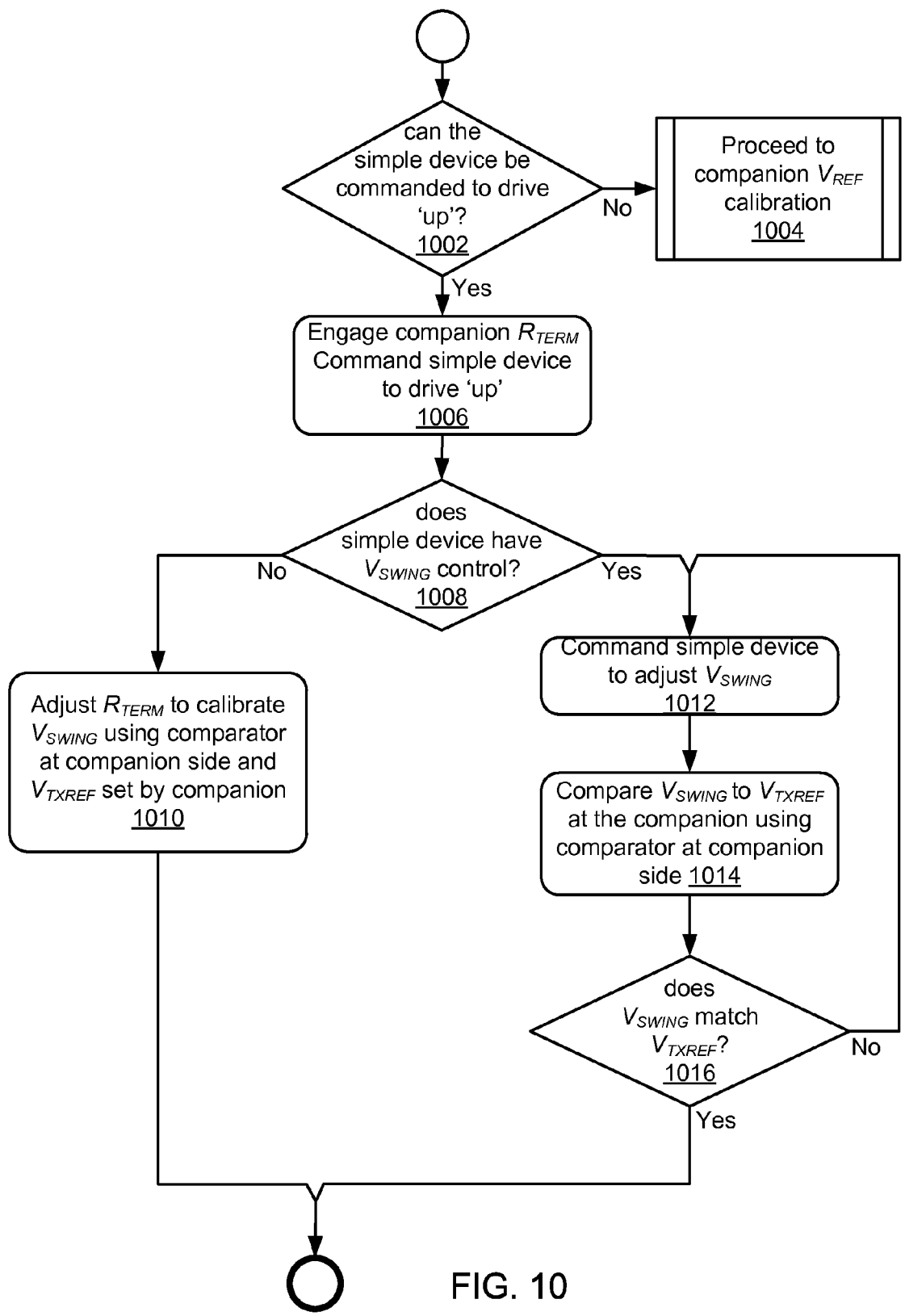
FIG. 10 is a flowchart of a remote signal swing calibration process performed by the data communication system of FIG. 9, according to one embodiment.
Figure 11:
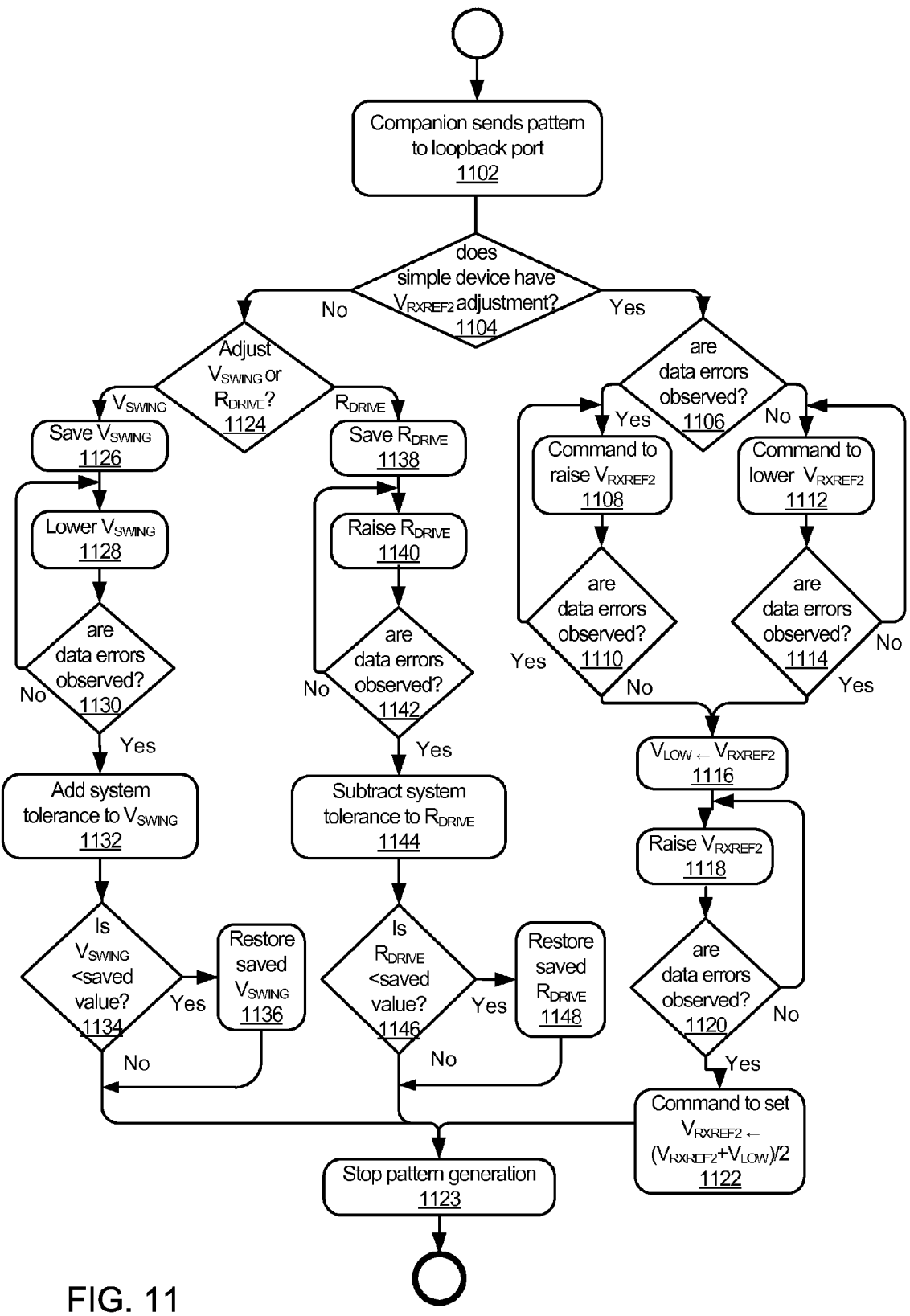
FIG. 11 is a flowchart of a remote trip reference voltage calibration process performed by the data communication system of FIG. 9, according to one embodiment.

In some embodiments, there are two main ways to approach co-calibration. One approach assumes that the device including the transmitter TX and the device including the receiver RX are both able to manage calibration on their own, which is referred to as a symmetric approach. FIGS. 5-8 that will be described in more detail below correspond to this symmetric approach. The other approach is used when one device is unable to calibrate itself, which is referred to as a simple device. This asymmetric approach relies on one of the devices, referred to as the companion device, to control the calibration of the simple device, as shown in FIGS. 9-11. For simplicity, the symmetric approach is described first.

Symmetric Calibration for $V_{SWING}$

Figure 5:
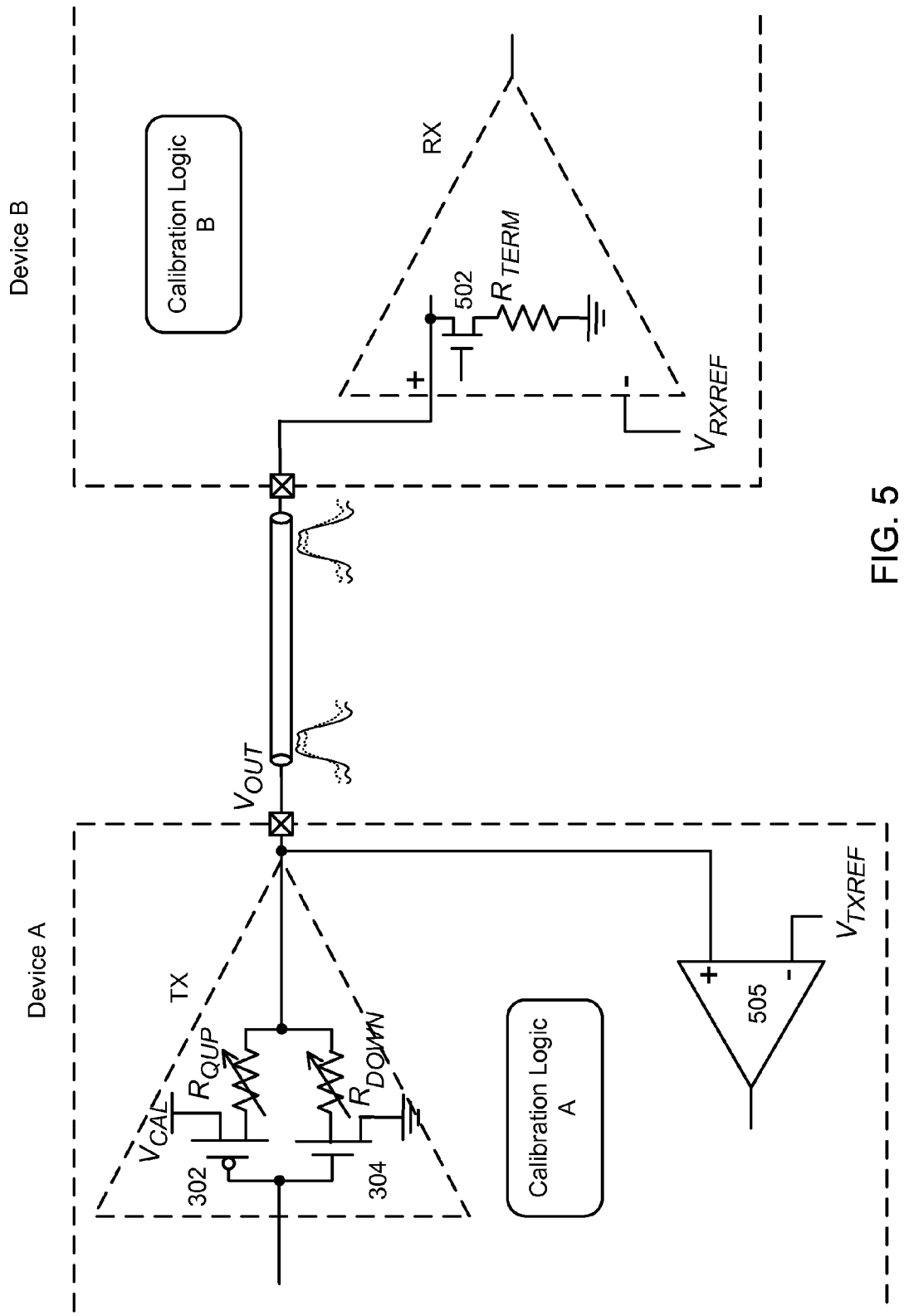
FIG. 5 is data communication system for symmetric calibration, according to one embodiment.

Referring to FIG. 5, illustrated is a data communication system for symmetric calibration, according to one embodiment. The illustrated symmetric calibration system includes a device A and device B. Device A includes a transmitter interface circuit TX, a comparator 505 and calibration logic A. Device B includes a receiver interface circuit RX and calibration logic B. Device A can be considered as a transmitting device and device B can be considered as a receiving device because device A is transmitting signals to device B. Other components, such as a receiver in device A and a transmitter on device B are excluded for ease of explanation. Calibration logic A manages calibration within device A and can control the other components through one or more signals (not shown). Calibration logic B manages calibration within device B and can control the other components through one or more signals (not shown). Both device A and device B can manage calibration on their own using calibration logic A and calibration logic B, respectively.

In this embodiment, the transmitter TX of device A is coupled to a single-ended connection channel. The transmitter TX drives the singled-ended connection channel with a supply voltage level $V_{CAL}$, using termination $R_{QUP}$. In the illustrated embodiment, the transmitter TX driver uses a pull-up resistor $R_{QUP}$ as the drive termination $R_{DRIVE}$ to drive the connection high. In other embodiments, there may be additional termination resistors other than those shown in FIGS. 3A-3C. For example, besides $R_{QUP}$, the drive termination $R_{DRIVE}$ may include an additional termination resistor connected between the transmitter TX output and ground. This additional resistor may be adjustable to make the overall drive termination $R_{DRIVE}$ impedance equal to an idealized value such as 50Ω even as $R_{QUP}$ is adjusted.

At the other end of the connection channel is a receiver RX. Receiver RX includes an N-channel transistor 502 that can be switched on to terminate the connection channel to a ground voltage level through termination $R_{TERM}$.

The transmitter TX generates an output voltage $V_{OUT}$ on the connection channel. Device A also includes a comparator 505 that compares the output voltage level $V_{OUT}$ to a transmission reference voltage level $V_{TXREF}$ and generates an output signal indicating whether the output voltage level $V_{OUT}$ is higher than the transmission reference voltage level $V_{TXREF}$. The transmission reference voltage level $V_{TXREF}$ represents threshold voltage swing; i.e. a target level of voltage swing $V_{SWING}$ for the output voltage $V_{OUT}$. The target voltage swing $V_{SWING}$ is typically a low voltage level (e.g. 300 mV) to minimize power consumption.

The calibration logic A can produce a high-quality transmission reference voltage $V_{TXREF}$ in many ways, including, but not limited to, a matched resistor divider, a precision voltage reference, or a combination of the two. In one embodiment, the transmission reference voltage level $V_{TXREF}$ is generated based on an ideal value of the receiver termination $R_{TERM}$, an ideal value of the pull-up termination $R_{QUP}$, an ideal value of the ground level at the receiver RX and an ideal value of the supply voltage level $V_{DD}$. For example, assume the ideal value for $R_{QUP}$ is 150 ohms, the ideal value for $R_{TERM}$ is 50 ohms and the ideal value for supply voltage $V_{CAL}$ is 2 volts. In this case, the ideal voltage swing $V_{SWING}$ can be determined to be 500 mV (50/200× 2V), so $V_{TXREF}$ would be set to 500 mV.

In addition, the calibration logic A can adjust up termination $R_{QUP}$ based on the output of the comparator 505 until the output voltage level $V_{OUT}$ reaches the transmission reference voltage level $V_{TXREF}$. For example, the calibration logic A decreases $R_{QUP}$ if the output of the comparator 505 indicates that the output voltage level $V_{OUT}$ is larger than the transmission reference voltage level $V_{TXREF}$. Similarly, the calibration logic A increases $R_{QUP}$ if the output of the comparator 505 indicates that the output voltage level $V_{OUT}$ is smaller than the transmission reference voltage level $V_{TXREF}$.

In some embodiments, a first step for calibrating signal swing in the symmetric approach is to engage the receiver termination $R_{TERM}$ and use the transmitter TX to drive the output voltage $V_{OUT}$ high using $R_{QUP}$. The voltage swing $V_{SWING}$ of the output voltage $V_{OUT}$ can then be calibrated at device A to produce a swing that substantially matches the transmitter reference voltage $V_{TXREF}$. $V_{OUT}$ is measured at device A, which is trimmed using a method that depends on the driver architecture of the transmitter TX. For example, the driver model described herein can make fine-adjustments to $R_{UP}$ as illustrated. In other embodiments, an architecture that allows for the control of $V_{CAL}$ can simply adjust that voltage source for $V_{CAL}$. Adjusting the voltage source for $V_{CAL}$ or adjusting the code for $R_{UP}$ are two examples of drive parameters affecting the output voltage $V_{OUT}$ that can be adjusted to adjust the output voltage $V_{OUT}$.

In another embodiment, instead of engaging the receiver's $R_{TERM}$, it may be possible to adjust $V_{SWING}$ using an internal or external calibration resistor such as $Z_Q$ in place of $R_{TERM}$.

Figure 6:
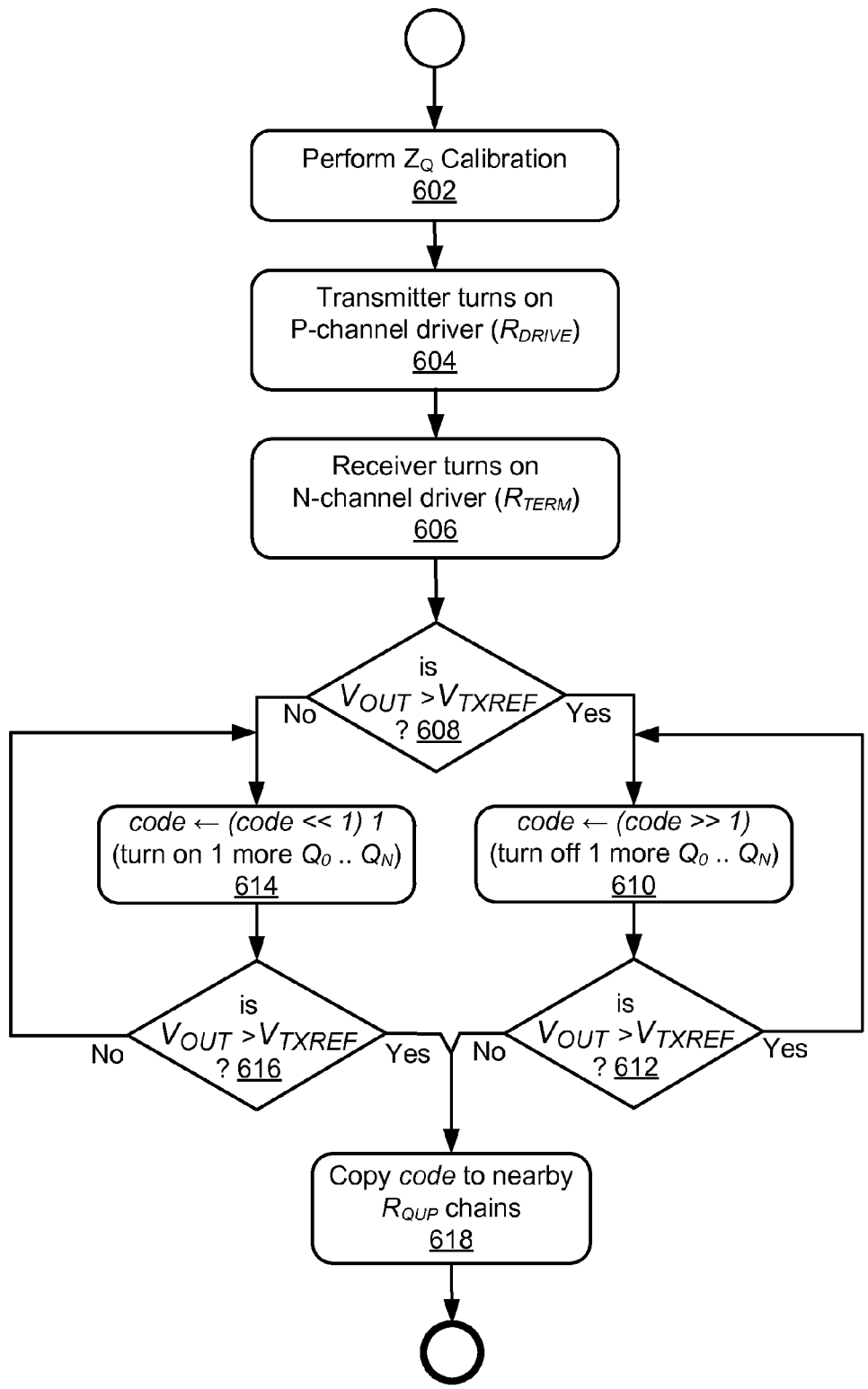
FIG. 6 is a flowchart for a method for calibrating signal swing performed by the data communication system of FIG. 5, according to one embodiment.

FIG. 6 is a flowchart for a method for calibrating signal swing performed by the data communication system of FIG. 5, according to one embodiment. In step 602, the calibration logic A performs $Z_Q$ calibration as described above with reference to FIG. 4. In step 604, the calibration logic A turns on P-channel drive transistor 302, which engages termination resistor $R_{UP}$ as the drive termination $R_{DRIVE}$. In step 606, the calibration logic B turns on N-channel transistor 502 at the receiver RX, which engages termination resistor $R_{TERM}$. In step 608, the calibration logic A determines if the output voltage level $V_{OUT}$ is larger than the transmission reference voltage level $V_{TXREF}$. For example, the calibration logic A analyzes the comparison output result of the comparator 505 at device A to determine if $V_{OUT}$ is larger than $V_{TXREF}$.

If the calibration logic A determines that $V_{OUT}$ is larger than $V_{TXREF}$, then in step 610 the calibration logic A decrements the calibration code to turn off one more of the weak $Q_O \ldots Q_N$ transistors in the $R_{QUP}$ chain. This increases the $R_{QUP}$ resistance and decreases the output voltage $V_{OUT}$. In step 612, the calibration logic A determines if the new $V_{OUT}$ is still larger than $V_{TXREF}$. If so, then the calibration logic A repeats step 612 to decrements the calibration code to turn off one more of the weak $Q_O \ldots Q_N$ transistors in the $R_{QUP}$ chain until the calibration logic A determines that the new $V_{OUT}$ is not larger than $V_{TXREF}$ and has thus reached $V_{TXREF}$.

If in step 608 the calibration logic A determines that $V_{OUT}$ is smaller than $V_{TXREF}$, then in step 614 the calibration logic A increments the calibration code to turn on one more of the weak $Q_O \ldots Q_N$ transistors in the $R_{QUP}$ chain. This decreases the $R_{QUP}$ resistance and increases the output voltage $V_{OUT}$. In step 616, the calibration logic A determines if the new $V_{OUT}$ is still smaller than $V_{TXREF}$. If so, then the calibration logic A repeats step 614 to increment the calibration code to turn on one more of the weak $Q_O \ldots Q_N$ transistors in the $R_{QUP}$ chain until the calibration logic A determines that the new $V_{OUT}$ is larger than $V_{TXREF}$ and has thus reached $V_{TXREF}$. The calibration code determined at steps 612 and 616 is copied to nearby $R_{QUP}$ chains for other transmitters TX in step 618.

This process may be repeated in the other direction to calibrate the $V_{SWING}$ for the output voltage $V_{OUT}$ produced by a transmitter (not shown in FIG. 5) of device B.

Symmetric Calibration $V_{RXREF}$

Figure 7:
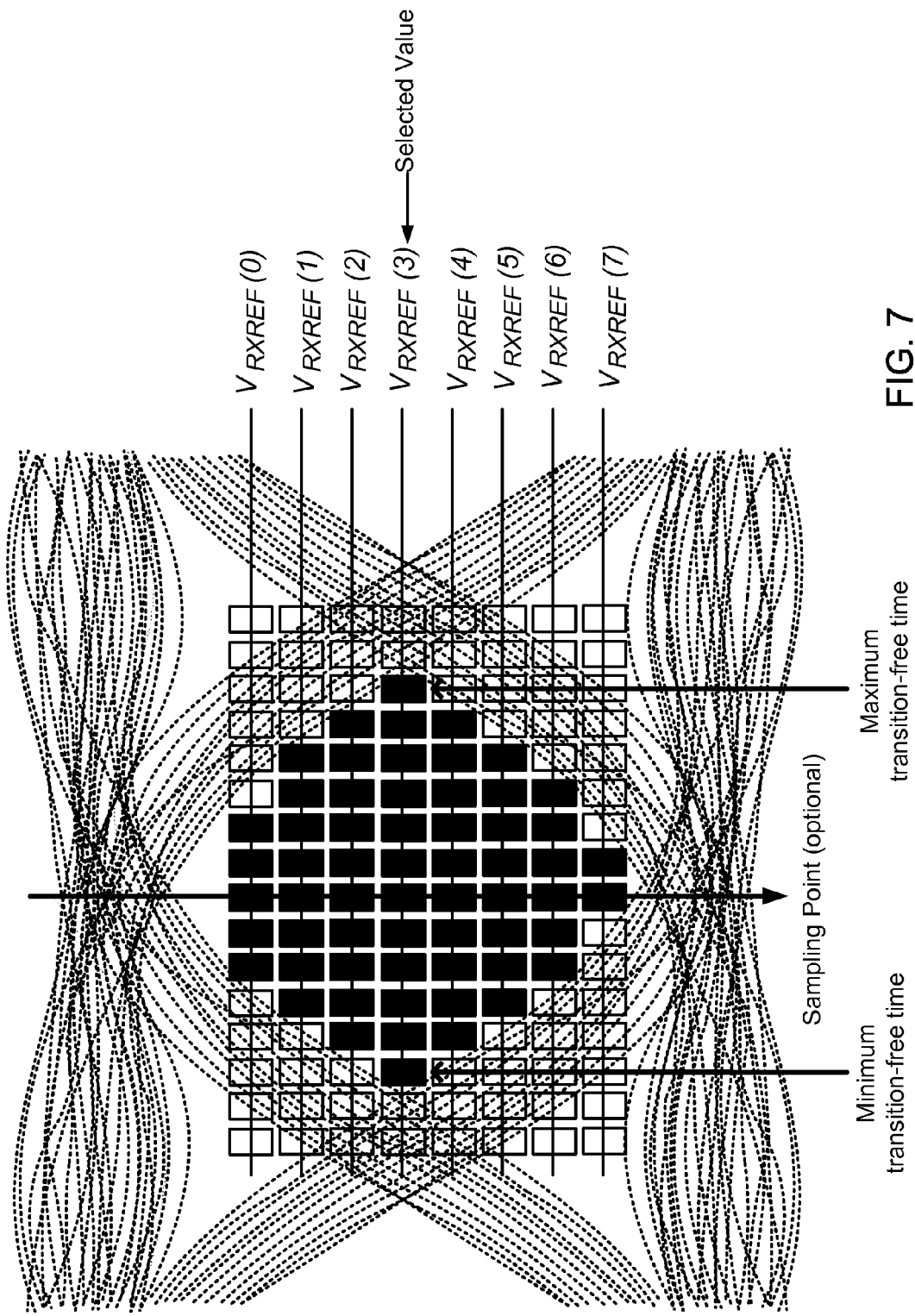
FIG. 7 is an eye diagram illustrating trip reference voltage calibration performed by the data communication system of FIG. 5, according to one embodiment.

In some embodiments, a second step of the symmetric calibration is to calibrate the trip reference voltage $V_{RXREF}$. FIG. 7 is an eye diagram illustrating trip reference voltage calibration performed by the data communication system of FIG. 5, according to one embodiment. In this embodiment, the transmitter TX sends a data pattern, such as a pseudo-random binary sequence (PRBS) or simpler pattern, to the receiver RX that exercises a range of frequency components, up to the maximum used for communication. The receiver RX scans the data eye using various values of its $V_{RXREF}$ while monitoring its sampler. The example graph in FIG. 7 illustrates an oversampling detector, but other sampling methods may apply.

As the calibration logic A changes $V_{RXREF}$ to different levels, the presence of data transitions are monitored by the sampler. The $V_{RXREF}$ that produces the longest contiguous time without transitions is deemed the best choice for $V_{RXREF}$. The time without transitions is also referred to as "transition-free time" or "transition-free sample time." The minimum transition-free sample time is the beginning of a period without transitions. The maximum transition-free sample time is the end of the period without transitions. In FIG. 7, the minimum and maximum transition-free sample times are shown for one selected value of $V_{RXREF}$. The selected value of $V_{RXREF}$ is the best value because it is the $V_{RXREF}$ that produces the widest data eye.

In addition, the sampling point in time can be defined as the mean or median of the minimum and maximum time offsets of the data transitions observed at the $V_{RXREF}$ level, whichever is applicable depending on the sampling method. The minimum and maximum time offsets are shown in FIG. 7 as the minimum and maximum transition-free time.

Figure 8:
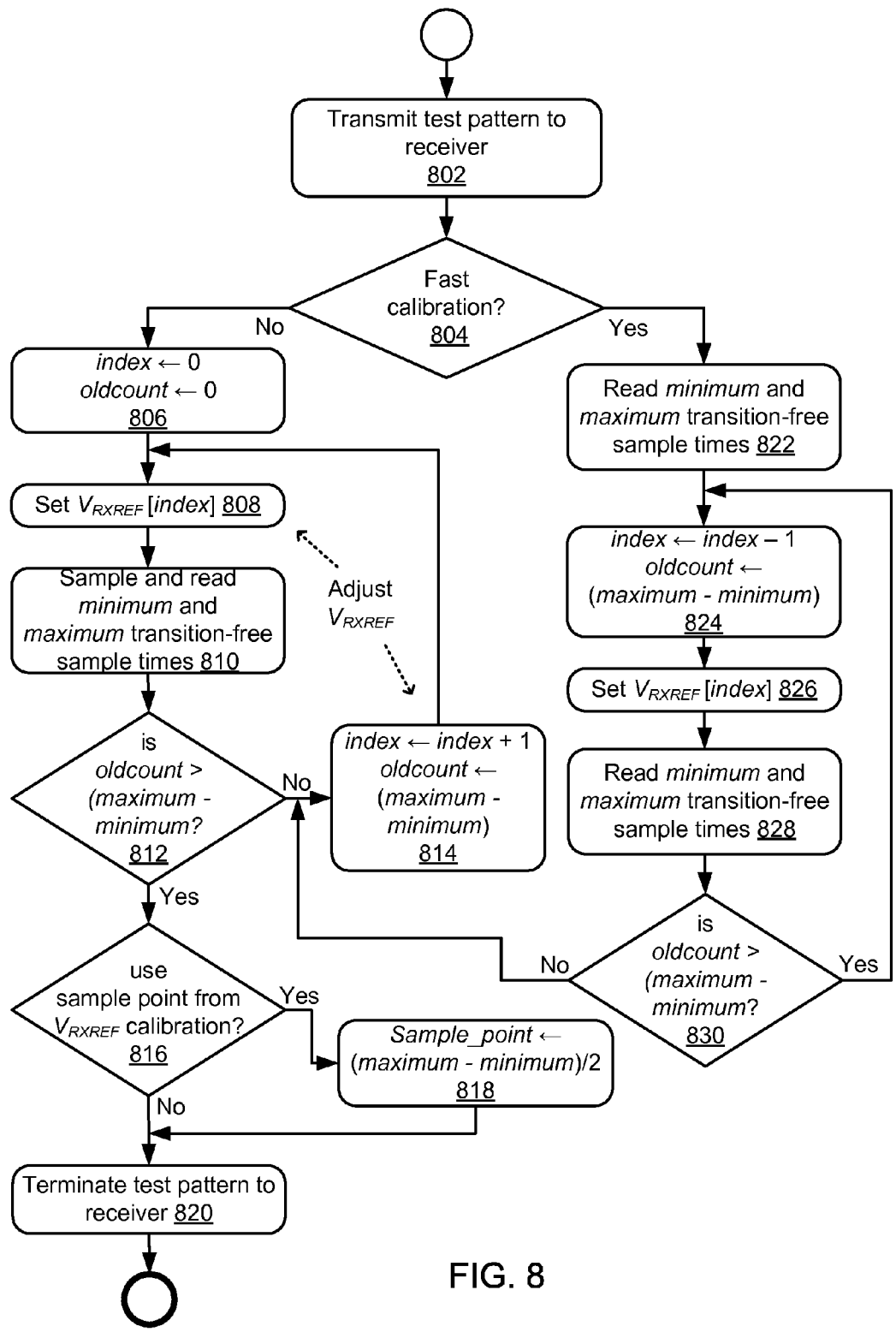
FIG. 8 is a flowchart of a method for calibrating trip reference voltage performed by the data communication system of FIG. 5, according to one embodiment.

FIG. 8 is a flowchart of a method for calibrating trip reference voltage performed by the data communication system of FIG. 5, according to one embodiment. In step 802, the calibration logic A controls the transmitter TX to transmit test data pattern to the receiver RX. In step 804, the calibration logic A determines if a fast calibration is appropriate. Fast calibration is typically appropriate for fine-tuning when the reference voltage $V_{RXREF}$ has already been calibrated in the past.

If not, then in step 806 the calibration logic B initiates a loop by setting an index to zero and setting an old count to zero. In step 808, the calibration logic B sets $V_{RXREF}$ to a voltage level corresponding to the index value. For example, as shown in FIG. 7, an index of zero may result in a low voltage $V_{RXREF}$, whereas higher indexes result in higher voltage $V_{RXREF}$.

In step 810, the calibration logic B samples the test data pattern and reads minimum and maximum transition-free sample times. In step 812, the calibration logic B determines if the old count is larger than the difference of the maximum and minimum transition-free times. If not, then in step 814 the calibration logic B increases the index by one and saves the difference of the maximum and minimum transition times in the old count. The method then returns to step 808 and repeats steps 808-812 until the calibration logic B determines that the old count is larger than the difference between the maximum and minimum transition-free times. Steps 808 and 814 are an example of adjusting $V_{RXREF}$. In this way, the calibration logic B finds the $V_{RXREF}$ resulting in the longest contiguous transition-free time and which maximizes the width of the data eye.

In step 816, the calibration logic B determines whether to use the sample point from the calibration. If yes, then in step 818 the calibration logic B calculates the sample point by dividing the difference of the maximum and minimum transition-free times by two. In step 820, the calibration logic A terminates sending the test pattern to receiver.

If in step 804 the calibration logic B determines that a fast calibration is appropriate, then in step 822 the calibration logic B reads the minimum and maximum transition-free sample times for the current $V_{RXREF}$. In step 824, the calibration logic B decreases the index by one and saves the difference of the maximum and minimum transition-free times to the old count. In step 826, the calibration logic sets $V_{RXREF}$ to a voltage level corresponding to the index value. In step 828, the calibration logic B reads the minimum and maximum transition-free sample times and in step 830, the calibration logic determines if the old count is larger than difference between the maximum and minimum transition-free times. If yes, the method turns to step 824 and the calibration logic B repeats the steps 824-830 until the calibration logic B determines that the old count is not larger than the difference between the maximum and minimum transition-free times, causing the method to proceed to step 814.

This process may be repeated in the other direction to calibrate the $V_{RXREF}$ for the receiver (not shown in FIG. 5) of device A.

Asymmetric Calibration for $V_{SWING}$

FIG. 9 is a data communication system for remote calibration, according to one embodiment. The illustrated data communication system corresponds to the second approach of calibration, i.e., the asymmetric calibration. The data communication system includes a simple device 902 (e.g., memory device) that may not have the ability to self-calibrate as described above, and a companion device 904 (e.g. a memory controller) to aid in calibration. Both the companion device 902 and the simple device 904 can be considered transmitting or receiving devices, depending on which device is transmitting and which is receiving.

The companion device 902 includes a transmitter TX1, a receiver RX1, a comparator 905 and companion calibration logic 910. The simple device 904 includes simple calibration logic 912, a receiver RX2 and a transmitter TX2. Companion calibration logic 910 sends calibration commands to the simple calibration logic 912 during calibration. Transmitter TX1 transmits data to receiver RX2 through one connection channel 950. Transmitter TX2 transmits data to receiver RX1 through another connection channel 952. Simplified versions of the transmitters TX1 and TX2 and receivers RX1 and RX2 are shown in FIG. 9, and the details of these circuits are similar to those described in previous figures.

The simple device 904 has the ability to loop data back to the companion device 904 and the ability to be commanded to do so. Data received at RX2 can be looped back through transmitter TX2. Other optional abilities that the simple device 904 might have to make the process more efficient are: commanding its transmitter TX2 to drive 'up' using $R_{UP}$, controlling $V_{RXREF2}$, controlling the transmitter TX2 swing (e.g., via $R_{UP}$), and generating a test pattern.

In some embodiments, to start companion-controlled calibration, the companion 902 acts as a receiver and engages its $R_{TERM}$ (e.g., typically $R_{DOWN}$). It also commands the simple device 904 to drive in the 'up' direction. The companion's comparator 905 can then be used for calibration according to the companion's $V_{TXREF}$. If the simple device 904 can be commanded to adjust its $V_{SWING}$, for example by adjusting its voltage source or $R_{DRIVE}$ (typically $R_{UP}$), then the process proceeds similar to a normal $V_{SWING}$ calibration.

If the simple device 904 has no control, for example it may have fixed $R_{UP}$ and $R_{DOWN}$ values, or ones that are pre-calibrated as described in the prior art (as in the memory case), or have no way to control $V_{SWING}$, then the companion's $R_{TERM}$ can be adjusted to meet the $V_{SWING}$ requirement.

In some embodiments, if there is no ability to command the simple device to drive 'up,' then an optimally efficient $V_{SWING}$ cannot be found using this method. Acceptable signal integrity can still be achieved by adjusting the companion device's $V_{RXREF1}$ to match the swing from the transmitter TX2 of the simple device 904.

In some embodiments, in order to calibrate the companion $V_{RXREF1}$ for receiving from a simple device 904, the simple device 904 may include a test pattern generator, or has the ability to echo a test pattern that is generated by the companion device 902. For example, high-speed memories already have loopback capability that is used to adjust timing. This can be reused for generating an acceptable pattern for adjusting $V_{RXREF1}$.

FIG. 10 is a flowchart of a remote signal swing calibration process performed by the data communication system of FIG. 9, according to one embodiment. In step 1002, the companion calibration logic 912 determines if the simple device 904 can be commanded to drive "up." If the simple device cannot be commanded to drive "up," the process proceeds to companion $V_{RXREF}$ calibration, as described above with reference to FIG. 7. If the simple device can be commanded to drive "up," then in step 1006 the companion calibration logic 910 engages companion $R_{TERM}$ and commands the simple device to drive "up."

In step 1008, the companion calibration logic 904 determines if the simple device 904 has $V_{SWING}$ control. If the simple device does not have $V_{SWING}$ control, then in step 1010 the companion calibration logic adjusts $R_{TERM}$ to calibrate $V_{SWING}$ using the comparator 905 at the companion side and the $V_{TXREF}$ set by the companion 902. For example, the companion calibration logic 910 adjusts $R_{TERM}$ to calibrate $V_{SWING}$ using a similar method as described above with reference to FIGS. 5-6.

If the simple device 904 has $V_{SWING}$ control, then in step 1012 the companion calibration logic 910 commands, via the simple device calibration logic 912, the simple device 904 to adjust $V_{SWING}$ of the output voltage $V_{OUT}$. If $V_{OUT}$ is too low, the simple device 904 is commanded to decrease $R_{UP}$ to increase $V_{SWING}$. If $V_{OUT}$ is too high, the simple device 904 is commanded to increase $R_{UP}$ to decrease $V_{SWING}$.

In step 1014, the companion calibration logic 910 compares the output voltage $V_{OUT}$ to the $V_{TXREF}$ using the comparator 905 at the companion device. In step 1016, the companion calibration logic 910 determines if the output voltage $V_{OUT}$ matches the $V_{TXREF}$ using the output result of the comparator 905. If $V_{OUT}$ does not match $V_{TXREF}$, then the process returns to step 1012 and the companion calibration logic 910 commands, via the simple device calibration logic 912, the simple device 904 to adjust $V_{SWING}$ again. The process repeats steps 1012-1016 until $V_{OUT}$ matches or reaches the $V_{TXREF}$.

Asymmetric Calibration $V_{RXREF2}$

Remote calibration of $V_{RXREF2}$ proceeds differently than for local calibration. The loopback is done digitally; that is, the receiver RX2 samples an incoming data pattern by comparing the current value of $V_{RXREF2}$ to the incoming data pattern to produce a digital value. This digital value is then transmitted through the loopback port as loopback data, which is essentially a sampled version of the original data pattern. The loopback data can then be observed by the companion device 902 and compared to the original data pattern. When errors are observed in the received loopback signal, then $V_{RXREF2}$ is adjusted. In one embodiment $V_{RXREF2}$ adjustment proceeds in one direction until errors in the loopback data are observable, and then in the other direction. The high and low values of $V_{RXREF2}$ can be averaged to produce the best results.

If the simple device has $V_{RXREF2}$ control, which is likely in high-speed memories, then this can be used directly. If there is no $V_{RXREF2}$ control, then the companion device 902 can adjust its $R_{DRIVE}$ (e.g., usually $R_{UP}$) or $V_{SWING}$ in transmitter TX1 to further change the signal swing. The latter is less optimal because $V_{SWING}$ is likely to become higher and use more power.

FIG. 11 is a flowchart of a remote trip reference voltage calibration process performed by the data communication system of FIG. 9, according to one embodiment. In step 1102, the companion sends a data pattern to the receiver RX2 of the simple device through transmitter TX1. In step 1104, the companion calibration logic 910 determines if the simple device 904 has $V_{RXREF2}$ adjustment abilities. If the simple device 904 has $V_{RXREF2}$ adjustment abilities, then in step 1106 the companion calibration logic 910 determines if any data errors are observed in the loopback data, which is received via receiver RX1. If at least one data error is observed, then in step 1108 the companion calibration logic 910 commands, via the simple device calibration logic 912, the simple device 904 to raise $V_{RXREF2}$. In step 1110, the companion calibration logic 910 determines again if any data errors are observed in the loopback data after the $V_{RXREF2}$ is raised. If there is still at least one data error observed, the process returns to step 1108 and steps 1108 and 1110 are repeated until no data error is observed.

Accordingly, if in step 1106 the companion calibration logic 910 determines that no data error is observed in the loopback data, then in step 1112 the companion calibration logic 910 commands the simple device to lower the $V_{RXREF2}$ and in step 1114 the companion calibration logic 910 determines again if any data errors are observed after the $V_{RXREF2}$ is lowered. The process repeats the steps 1112-1114 until data errors are observed.

In step 1116, the companion calibration logic saves the adjusted $V_{RXREF2}$ as $V_{LOW}$. Steps 1106-1116 thus establish a low value for $V_{RXREF2}$ for which data errors are observed.

In step 1118, the companion calibration logic 910 raises the $V_{RXREF2}$, and in step 1120, determines if any data errors are observed from loopback data received via receiver RX1. The process repeats the steps 1118-1120 until data errors are observed. The resulting $V_{RXREF2}$ represents a high value for $V_{RXREF2}$ for which data errors are observed. In step 1122, the companion calibration logic 910 commands the simple device to set the new $V_{RXREF2}$ as the average of the current $V_{RXREF2}$ and the $V_{LOW}$. Step 1122 thus averages the lowest $V_{RXREF2}$ with the highest $V_{RXREF2}$. In step 1123, the companion calibration logic stops the pattern generation.

If the simple device 904 does not have $V_{RXEF2}$ adjustment, then in step 1124 the companion calibration logic 910 determines if it should adjust $V_{SWING}$ or $R_{DRIVE}$ of transmitter TX1. These adjustments are alternatives to adjusting $V_{RXREF2}$ directly such that $V_{RXREF2}$ has a value that is approximately half of $V_{SWING}$.

If the companion calibration logic 910 determines to adjust $V_{SWING}$ of TX1, then in step 1126 the companion calibration logic 910 saves the $V_{SWING}$. In step 1128, the companion calibration logic lowers the $V_{SWING}$, and in step 1130, determines if any date errors are observed from loopback data received via receiver RX1. If no data error is observed, then the process repeats the steps 1128-1130 until data errors are observed.

In step 1132, the companion calibration logic 910 adds a predetermined system tolerance (e.g. 50 mV) to the $V_{SWING}$, and in step 1134, determines if the $V_{SWING}$ is smaller than the saved value at the beginning. If yes, the companion calibration logic 910 restores the saved $V_{SWING}$, and stops 1123 the pattern generation. Otherwise, the companion calibration logic stops 1123 the pattern generation directly. This results in a $V_{SWING}$ for TX1 that may be lower than the original $V_{SWING}$. In one embodiment, adjusting the $V_{SWING}$ is adjusting, for example, $V_{CAL}$ from FIG. 3A-3C.

If the companion calibration logic 910 determines to adjust $R_{DRIVE}$ (e.g., $R_{UP}$) of the transmitter TX1, then in step 1138 the companion calibration logic 910 saves the current $R_{DRIVE}$. In step 1140, the companion calibration logic 910 raises the $R_{DRIVE}$, and in step 1142, determines if any data errors are observed from loopback data received via receiver RX1. If no data error is observed, then the process repeats the steps 1140-1142 until data errors are observed.

In step 1144, the companion calibration logic 910 subtracts a pre-determined system tolerance to the $R_{DRIVE}$, and in step 1146, determines if the $R_{DRIVE}$ is smaller than the saved value at the beginning. If so, then in step 1146 the companion calibration logic 910 restores the saved $R_{DRIVE}$, and stops 1123 the pattern generation. This results in a $R_{DRIVE}$ for TX1 that may be higher than the original $R_{DRIVE}$. Otherwise, the companion calibration logic stops 1123 the pattern generation directly.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to, with, or together with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

Upon reading this disclosure, those of skill in the art will appreciate still additional alternative designs for a calibration of single-ended high speed interfaces. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and device of the present disclosure disclosed herein without departing from the spirit and scope of the disclosure as defined in the appended claims.

What is claimed is:

1. A method of calibrating a trip reference voltage, the method comprising:
    receiving, at a receiving device, a data pattern from a transmitting device via a connection;
    comparing, at the receiving device, the data pattern with the trip reference voltage to generate samples of the data pattern;
    monitoring, at the receiving device, the samples for data transitions in the data pattern;
    determining at the receiving device, a difference between a first time corresponding to a first data transition of the data transitions and a second time corresponding to a second data transition of the data transitions; and
    adjusting, at the receiving device, the trip reference voltage based on the difference.

2. The method of claim 1, wherein the trip reference voltage is adjusted until a duration of time between the data transitions is maximized.

3. The method of claim 1, further comprising:
    setting a sampling point to an average of the first time corresponding to the first data transition of the data transitions and the second time corresponding to the second data transition of the data transitions.

4. The method of claim 1, wherein the connection is a single-ended connection.

5. A receiving device comprising:
    a receiver interface to receive a data pattern from a transmitting device via a connection;
    wherein the receiving device compares the data pattern with a trip reference voltage to generate samples of the data pattern, monitors the samples for data transitions in the data pattern, determines a difference between a first time corresponding to a first data transition of the data transitions and a second time corresponding to a second data transition of the data transitions, and adjusts the trip reference voltage based on the difference.

6. The receiving device of claim 5, wherein the receiving device adjusts the trip reference voltage until a duration of time between the data transitions is maximized.

7. The receiving device of claim 5, wherein the receiving device sets a sampling point to an average of the first time corresponding to the first data transition of the data transitions and the second time corresponding to the second data transition of the data transitions.

8. The receiving device of claim 5, wherein the connection is a single-ended connection.

9. A transmitting device, comprising:
    a transmitter interface to transmit a data pattern to a receiving device via a connection,
        the receiving device comparing the data pattern to a trip reference voltage to generate a sampled version of the data pattern; and
    a receiver interface to receive the sampled version of the data pattern from the receiving device;
    wherein the transmitting device compares the data pattern to the sampled version of the data pattern and commands the receiving device to adjust the trip reference voltage based on a result of comparing the data pattern to the sampled version of the data pattern.

10. The transmitting device of claim 9, wherein the transmitting device commands the receiving device to increase the trip reference voltage responsive to the result of comparing the data pattern to the sampled version of the data pattern indicating a data error.

11. The transmitting device of claim 9, wherein the transmitting device commands the receiving device to lower the trip reference voltage responsive to the result of comparing the data pattern to the sampled version of the data pattern indicating a data error.

12. The transmitting device of claim 9, wherein the transmitting device uses the result to identify a first level of the trip reference voltage producing data errors and to identify a second level of the trip reference voltage producing data errors, the transmitting device averaging the first level and the second level of the trip reference voltage to generate a setting for the trip reference voltage.

13. The transmitting device of claim 9, wherein the connection is a single-ended connection.

14. The method of claim 1, wherein the trip reference voltage is adjusted to maximize a transition free time.

15. The receiving device of claim 5, wherein the receiving device adjusts the trip reference voltage to maximize a transition free time.

\* \* \* \* \*